April 23, 1968      M. W. SENG      3,379,371
AVERAGING DEVICE
Filed Dec. 1, 1966      3 Sheets-Sheet 1
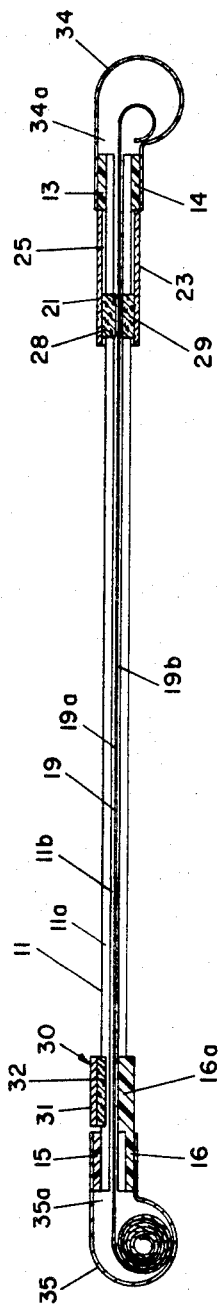
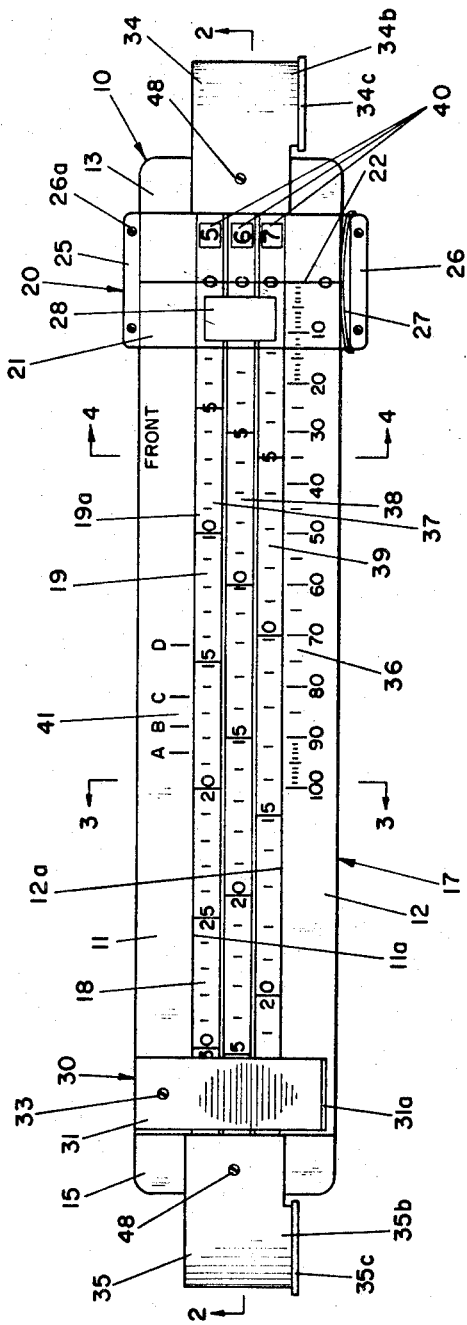
INVENTOR
MARK W. SENG
BY
Howard W. Bruner
ATTORNEY April 23, 1968   M. W. SENG   3,379,371
AVERAGING DEVICE
Filed Dec. 1, 1966   3 Sheets-Sheet 2

INVENTOR
MARK W. SENG
BY
Howard W. Bremer
ATTORNEY

April 23, 1968
M. W. SENG
3,379,371
AVERAGING DEVICE
Filed Dec. 1, 1966
3 Sheets-Sheet 3
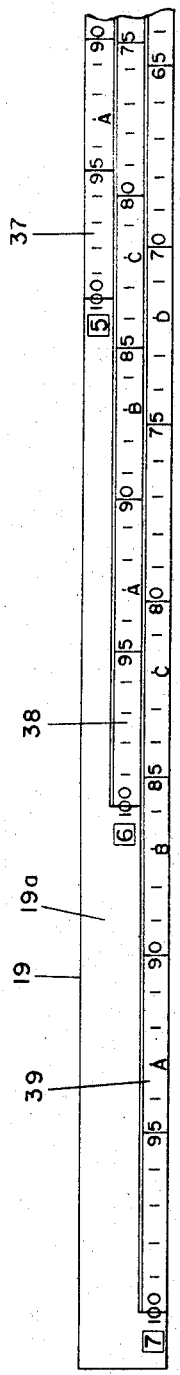
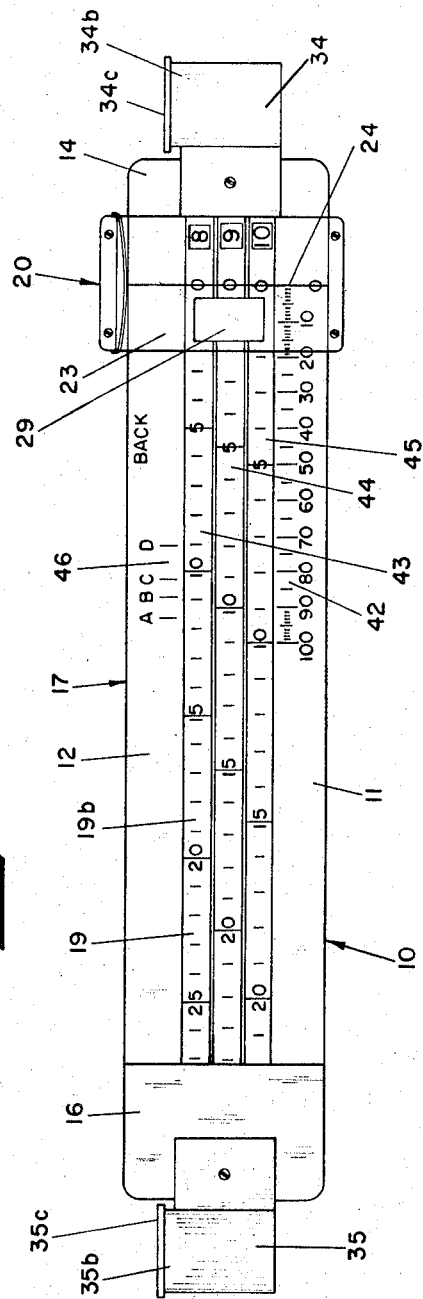
INVENTOR
MARK W. SENG
BY
Howard W Bremer
ATTORNEY

United States Patent Office 3,379,371
Patented Apr. 23, 1968

3,379,371
AVERAGING DEVICE
Mark W. Selig, Madison, Wis., assignor to Wisconsin Alumni Research Foundation, Madison, Wis., a corporation of Wisconsin
Filed Dec. 1, 1966, Ser. No. 598,241
8 Claims. (Cl. 235—61)

ABSTRACT OF THE DISCLOSURE

An arithmetic averaging device which comprises two elongate members connected together in spaced relationship to form a tape receiving channel therebetween, an inelastic flexible tape slideably received in such channel and a hairline containing cursor slideably mounted on the elongate member and capable of movement independently of the tape. At least one of the elongate members carries an inscribed main numerical scale graduated from the smallest to the largest of the figures to be averaged and the tape has at least one scale inscribed upon it which is visible in conjunction with the main numerical scale and which is as many times longer than the main numerical scale as the greatest number of figures to be averaged.

---

This invention relates generally to computing devices and more specifically to devices for computing the arithmetic average of a group of figures.

Averaging a group of figures is, of course, a relatively simple arithmetic process, the figures are merely added and the total divided by the number of figures added. Generally, where only a few figures are to be averaged or where only a few averages need be computed, the calculations are carried out with pencil and paper and, although time consuming, usually with a reasonable degree of accuracy. In office or business situations, automatic computers are usually available and are utilized. These are excellent but, because of their high cost, are usually provided only where they will receive relatively heavy use. A great problem in terms of time arises where periodically many averages must be computed without the benefit of a costly automatic computer.

This problem is particularly prevalent among educators. Several times each year a teacher may have to average a rather large number of numerical grades for each of a large number of students and arrive at a final grade for the school term. In the modern departmentalized-type urban school, a single teacher may have several hundred students for whom grades must be determined. The job of computing the grades, arising only several times a year, does not in most cases warrant the availability of costly automatic calculating machines. The laborious task falls on the teacher, who usually proceeds with pencil and paper. This method of approaching the problem, besides being very time consuming, presents a great possibility of arithmetic error.

The problem is further complicated by the fact that each student may have both numerical and letter grades that must be averaged together. Moreover, in different locales or with different teachers different numerical ranges may be used to represent the same letter grade.

Accordingly, a primary object of my invention is to provide an inexpensive averaging device for quickly and accurately determining the average of a group of figures.

Another object of my invention is to provide an inexpensive averaging device for quickly and accurately averaging scholastic numerical grades, letter grades, or combinations thereof, and for translating resulting numerical averages into letter equivalents or vice versa.

Another object of my invention is to provide an inexpensive averaging device which is simple to operate.

Other objects, features and advantages of my invention will be apparent from the following detailed description taken in conjunction with the accompanying drawings wherein a preferred embodiment of the principles of my invention has been selected for exemplification.

In the drawings:

FIG. 1 is a front view of an averaging device embodying my invention.

FIG. 2 is a sectional view of the averaging device taken along line 2—2 of FIG. 1.

FIG. 5 is a back view of the averaging device of FIG. 1.

FIG. 6 is a fragmentary view of the front of the opposite end of the calibrated tape shown in FIG. 1.

Figure 3:
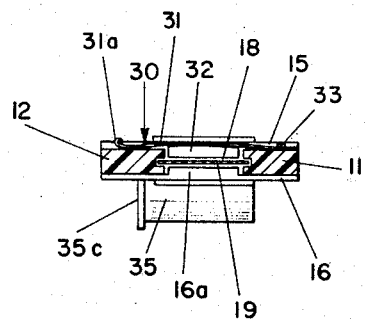
FIG. 3 is a sectional view along line 3—3 of FIG. 1.
Figure 4:
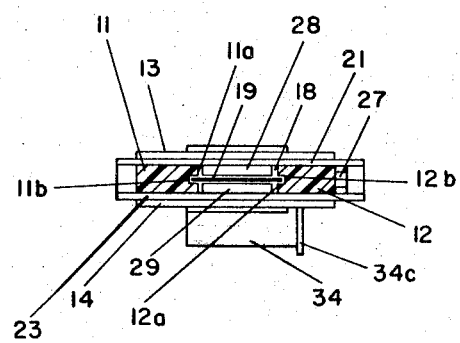
FIG. 4 is a sectional view along line 4—4 of FIG. 1.

My novel averaging device is based on the arithemtic rule that the sum of a group of figures divided by a number is equal to the sum of each of the several figures individually divided by the other number. Expressed algebraically:

$$\frac{a+b+c+d \ldots +z_n}{x} = \frac{a}{x}+\frac{b}{x}+\frac{c}{x}+\frac{d}{x} \ldots +\frac{z_n}{x}$$

In the special case where $x$ is equal to $n$, the number of figures in the numerator, the result is equal to the arithmetic average of the figures in the numerator. Using five figures for instance, the above equations would be:

$$\frac{a+b+c+d+e}{5} = \frac{a}{5}+\frac{b}{5}+\frac{c}{5}+\frac{d}{5}+\frac{e}{5}$$

Obviously, the second part of this equation may also be written as:

$$1/5(a)+1/5(b)+1/5(c)+1/5(d)+1/5(e)$$

The constant, 1/5 in this case, of $1/n$ for any case where $n$ represents the number of figures to be averaged, will appear as multiplier for each individual figure. This concept translated into physical dimensions, forms the basis of my averaging device 10 shown in the drawings wherein like numerals refer to like parts throughout the several views.

My novel averaging device generally shown at 10 may be constructed of a pair of substantially rigid, elongated members 11 and 12 fixedly connected together at their ends in spaced relation by two pairs of transverse cross-members 13, 14, 15 and 16 to form a substantially rigid frame 17. In the device 10 shown in the drawings for exemplification, members 11–16 are made of plastic and are permanently bonded together. Elongate members 11 and 12 are spaced apart to form a channel 18 therebetween. The inner edges 11a and 12a of members 11 and 12 facing toward the channel 18 are longitudinally grooved along their entire lengths forming tape tracks 11b and 12b.

As best seen in FIGS. 2 and 3, crossmember 16 preferably has a thicker pad portion 16a which extends into the channel 18 to about the edge of the tape tracks 11b and 12a.

A calibrated tape 19 is slideably carried in tracks 11b and 12b. The tape 19 is preferably comprised of an opaque flexible material such as made from pyroxylin and camphor and sold under the trademark Celluloid.

A cursor 20 is slideably mounted on the elongate members 11 and 12. As seen in FIGS. 1–5 the cursor 20 has a clear plastic front face 21 having a transverse hairline 22 therein and a clear plastic back face 23 having a transverse hairline 24 therein. The clear plastic faces 21 and 23 are connected together in spaced relation by end spacers 25 and 26 and screws 26a. One end of the cursor carries a band spring 27 for maintaining the cursor hairlines perpendicularly aligned with the elongated members 11 and 12 and for releasably holding the cursor wherever it is manually positioned on the frame 17.

The front and back faces 21 and 23 of the cursor 20 are spaced from the tape 19 mounted in the tracks 11b and 12b of the elongated members 11 and 12. A first friction tab 28, is bonded to the inside of front face 21 of the cursor adjacent to and spaced slightly from the front surface 19a of the slideable calibrated tape 19. Similarly, a second friction tab 29 is bonded to the inside of the back face 23 of the cursor adjacent to and spaced slightly from the back surface 19b of tape 19. Normally, the tape just clears the tabs 28 and 29, however, when the front and back faces 21 and 23 of the cursor are grasped between the thumb and fingers of one hand and slight pressure is applied, the faces are flexed inwardly and the tabs 28 and 29 frictionally engage the slideable tape whereby the tape and cursor may be moved together, without any relative movement between them. When the pressure is relieved, the cursor 20 and tape 19 may both be moved individually.

A tape brake 30 may be provided for preventing the tape 19 from moving when the cursor 20 is being manipulated separately. The tape brake 30 comprises a light gauge, resilient, metal leaf spring 31 having a friction tab 32 mounted on the inner surface of leaf spring 31 opposite pad portion 16a of crossmember 16. The leaf spring is fixedly attached at one end as by screw 33 to the frame structure so as to traverse the tape channel 18 above the pad portion 16a of crossmember 16. The leaf spring is slightly bowed with the concave surface thereof facing toward the tape channel 18.

Preferably, the leaf spring is attached to the frame structure 17 at only one end so that the other end may extend outwardly when the spring is depressed. The free end 31a is preferably coiled to permit free sliding movement on elongate member 12.

Slight thumb or finger pressure applied to the leaf spring will depress the friction tab 32 whereby the slideable tape 19 will be frictionally held between the tab 32 and pad portion 16a of crossmember 16 thereby preventing movement of the tape.

A pair of generally cylindrical tape containers 34 and 35 are attached at the ends of the frame structure 17. The tape containers are preferably formed of plastic or light gauge metal and are fixedly attached to the crossmembers 13–16 and by screws 48 or the like. Slots 34a and 35a are provided in tape containers 34 and 35, through which the tape 19 may pass during operation of the computer device. The containers have open ends 34b and 35b for inserting new tapes when desired. The open ends 34b and 35b of the containers are closed by snap-on plastic covers 34c and 35c.

As shown in FIG. 1, a first main numerical scale 36 is inscribed on the front of elongate member 12. In the illustrative example shown in the drawings, scale 36 is graduated from zero to one hundred from right to left. Main numerical scale 36 is so oriented that the zero point thereof and the hairline 22 line up exactly when the cursor 20 is moved so far as it will go to the right, that is, when the cursor abuts crossmember 13.

The slideable calibrated tape 19 shown has three separate scales on the front surface 19a thereof. The first scale, 37, is for averaging five figures, the second scale, 38, is provided for averaging six figures, and the third scale, 39, is provided for averaging seven figures. Each of the scales 37–39 on the front of tape 19 is designated by a numeral such as shown at 40 inscribed on the tape indicating the number of figures that can be averaged by using that particular scale. To further facilitate operation, each of the scales can be imprinted in a different color or the band upon the tape in which each scale appears can be given a different background color.

In FIG. 1, the tape 19 is shown in the starting position for the averaging operation, the zeros of the scales on the tape being aligned with the zero on main numerical scale 36. This alignment of the tape 19 and main numerical scale 36 illustrates how the mathematical concept is related to the physical properties of my novel averaging device.

Basically each of scales 37, 38 and 39 on the front of tape 19 is graduated from zero to one hundred and is as many times longer than main numerical scale 36 as the number of figures that can be averaged by using that particular scale. That is for example, the scale 37, for averaging five figures, is five times as long as main numerical scale 36. As can readily be seen from FIG. 1, the values on scale 37 are one-fifth of the corresponding values on main numerical scale 36 when the zero points of the scales are aligned. Similarly, the values on scale 38, for averaging six figures, are one-sixth of the corresponding values on main numerical scale 36, and those on scale 39, for averaging seven figures, are one-seventh. Thus, any given value on main numerical scale 36, represented by a fixed length on that scale, will be fractionally represented on an equivalent length of the scales on tape 19. This dimensional relationship incorporates the mathematical concept of my invention into the novel physical device.

It is to be appreciated that without departing from the mathematical concept herein involved the representative scales may be graduated from 50 to 100 rather than from zero to 100. This would serve to either enable the length of the tape to be reduced or allow the imprinting of an expanded scale which would provide for greater accuracy in the averaging.

The operation of my novel averaging scale can best be illustrated by describing the steps to be taken in solving a hypothetical problem. By way of example, assume that you wish to find the average of 60, 90, 85, 80 and 75. Here, we have a total of five figures to be averaged and will therefore use scale 37 designated on the tape 19 by the "5" in the square as shown at 40.

The first step in the averaging operation is to align the zero point of scale 37 with the zero point on main numerical scale 36. It will be noted that the zero point on main numerical scale 36 is so located that it coincides with the hairline 22 when the cursor 20 abuts the crossmember 13 which functions as a cursor stop. Thus, the hairline 22 on the cursor can be used to assist in aligning the zero points of the scales.

When the tape is placed in proper starting position, the operator may releasably lock it in place by depressing the tape brake 30 and frictionally engaging the tape between the pressure tab 32 and pad portion 16a. The cursor 20 may then be moved without disturbing the tape.

Moving the cursor 20 to the left, the hairline 22 is placed over the first figure to be averaged, in this case, sixty, where it appears on main numerical scale 36. It will be noted that the corresponding value on scale 37 on the tape is twelve, or one-fifth of sixty.

The next step consists of releasing tape brake 30 and engaging the tape with the cursor friction tabs 28 and 29 by applying pressure to the flexible cursor faces 21 and 23, and then sliding the cursor 20 and the slideable tape 19 to the right until the cursor 20 abuts against the cursor stop, namely the edge of crossmember 13. During this operation, a length of the tape 19 is moved out of the frame channel 18 and into the cylindrical tape container 34, where it forms a coil. Thus, a section of tape representing one-fifth of sixty has been "stored."

The operator then again locks the tape 19 with the tape brake 30 and repeats the operation for each of the succeeding figures except the last, each time "storing" an additional segment of tape equivalent to one-fifth of the particular figure. After the second to last figure has been "stored," the cursor 20 is positioned with the hairline 22 over the last figure to be averaged, in this case 75, on the numerical scale 36. The average of the five figures may then be read under the hairline 22 on scale 37 on the tape.

It will be noted that once the averaging operation is started, there is no reference to the numerical values on the scales on the tape 19 until the operation has been completed.

As an added feature, an auxiliary scale 41 consisting of scholastic letter grades may be inscribed on the elongate member 11 opposite main numerical scale 36. Auxiliary scale 41 is so positioned in relation to scale 36 that the letter grades A, B, C and D on scale 41 coincide with their numerical equivalents on scale 36. That is, letter grade A on auxiliary scale 41 is opposite numerical grade 93 on main scale 36, B is opposite 88, C is opposite 82, and D is opposite 72. The relationship between the letter grades and their numerical equivalents has been chosen arbitrarily and means can be provided for any particular individual to set up scale 41 so that the letter grades represent any range of numerical equivalents that may be preferred. Such means can, for example, comprise making the surface of member 11 receptive to marking with pen, pencil, etc. As shown in FIG. 6, letter grades A, B, C and D may also be inscribed on the tape 19 corresponding to their numerical equivalents on the scales 37, 38 and 39. So inscribed, my averaging device can also be used to average letter grades, to average mixed letter and number grades, and to translate resulting letter averages into numerical equivalents and vice versa.

While FIG. 1 shows three scales 37, 38 and 39 on the front of tape 19, my invention is not limited to this number of scales and any number, within the bounds of easy readability and convenient overall size of the device, may be used.

Further, as shown in FIG. 5, my device is designed to permit scales to be placed on the back of the opaque tape 19, to be used in conjunction with a second main numerical scale 42 on the back of member 11. The scale 45 for averaging ten figures may be made equal in size to the scale 39 for averaging seven figures by making the second main numerical scale 42 seven-tenths as long as the main numerical scale 36. The scales for averaging eight and nine figures, scales 43 and 44, respectively, will, of course, be smaller than the scale 45 for ten figures since they are lesser multiples of the second main numerical scale 42. Alternatively, scale 42 may be made equal in size to scale 36 provided the tape is of sufficient length to permit the averaging of ten figures, i.e. the tape must be at least ten times as long as scale 36 or 42. A letter grade scale 46 may also be provided on the back side of the frame 17.

Tape 19 may be removed from the device by sliding the entire tape into either of the containers 34 or 35 and then taking off the cover and removing the tape. Additional tapes having scales for averaging different numbers of figures may be provided and quickly inserted into the device or, alternatively, the tapes may be placed in cartridges which can then readily be inserted into a properly adapted retaining structure having the general configuration shown in FIGURE 1.

It is understood that my invention is not confined to the particular construction and arrangement of parts herein illustrated and described, but embraces all such modified forms thereof as come within the scope of the following claims.

I claim:
1. An arithmetic averaging device, comprising:
   (a) a substantially rigid frame having a pair of elongate members fixedly connected together in spaced relation by a pair of crossmembers, said elongate members forming a channel therebetween and having grooved inwardly facing edges forming tape receiving tracks along the entire length thereof,
   (b) a main numerical scale inscribed on one of said elongate members, said main numerical scale being graduated at least from the smallest to the largest of the figures to be averaged,
   (c) an inelastic, flexible tape slideably received in said tracks and having at least one scale visible in conjunction with said main numerical scale graduated at least from the smallest to the largest of a given number of figures which are to be averaged, said tape and the scale thereon being at least as many times longer than said main numerical scale as the greatest number of figures to be averaged, and
   (d) a cursor having a hairline extending transversely of said tape scale and said main numerical scale, said cursor being slideably mounted on said elongate members so that said hairline may be moved across the entire length of said main numerical scale independently of said tape.

2. The arithmetic averaging device as specified in claim 1 wherein the scale on the front of said tape and said main numerical scale are graduated from zero to one hundred.

3. The arithmetic averaging device as specified in claim 2 including means for limiting the movement of said cursor beyond a point where said hairline will be aligned with the zero graduation on said main numerical scale.

4. The arithmetic averaging device as specified in claim 2 including auxiliary scale consisting of scholastic letter grades inscribed on the front of one of said elongate members, said letter grades coinciding with their numerical equivalents on said main numerical scale, said tape also having scholastic letter grades inscribed on the front thereof coinciding with their numerical equivalents on the scale on the front of said tape.

5. The arithmetic averaging device as specified in claim 1 including means on said cursor for releasably engaging said tape for moving said tape and cursor together.

6. The arithmetic averaging device as specified in claim 1 including means for releasably locking said tape against movement while said cursor is moved individually.

7. The arithmetic averaging device as specified in claim 6 wherein said means comprises a leaf spring mounted on said frame and extending over said channel and a friction tab positioned on said leaf spring for movement into said channel for frictionally engaging said tape.

8. The arithmetic averaging device as specified in claim 1 including a container attached to each end of said frame and having openings through which said tape can enter and pass out during operation of said device.

References Cited
UNITED STATES PATENTS

| | | | |
|---|---|---|---|
| 460,930 | 10/1891 | Cox | 235—70.2 |
| 2,256,116 | 9/1941 | Hughes | 235—61.2 |
| 2,277,993 | 3/1942 | Preston | 235—69 |
| 2,546,243 | 3/1951 | Tarshis | 235—70.2 |
| 2,615,630 | 10/1952 | Eckel | 235—70.2 |
| 2,980,325 | 4/1961 | Pisarra | 235—86 |
| 2,988,270 | 6/1961 | Quist | 235—61 |

FOREIGN PATENTS 594,427  11/1947  Great Britain.

RICHARD B. WILKINSON, *Primary Examiner.*

S. A. WAL, *Assistant Examiner.*